(12) United States Patent
Lang

(10) Patent No.: US 9,365,783 B2
(45) Date of Patent: Jun. 14, 2016

(54) PROCESS AND APPARATUS FOR PRODUCING SYNTHESIS GAS

(71) Applicant: LINDE AKTIENGESELLSCHAFT, Munich (DE)

(72) Inventor: Martin Lang, Munich (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 25 days.

(21) Appl. No.: 14/559,309

(22) Filed: Dec. 3, 2014

(65) Prior Publication Data
US 2015/0151963 A1 Jun. 4, 2015

(30) Foreign Application Priority Data
Dec. 3, 2013 (DE) .......... 10 2013 020 343

(51) Int. Cl.
*C10J 3/00* (2006.01)
*C01B 3/24* (2006.01)
*C01B 3/38* (2006.01)

(52) U.S. Cl.
CPC . *C10J 3/00* (2013.01); *C01B 3/384* (2013.01); *C01B 2203/0233* (2013.01); *C01B 2203/043* (2013.01); *C01B 2203/046* (2013.01); *C01B 2203/0415* (2013.01); *C01B 2203/0475* (2013.01); *C01B 2203/0495* (2013.01); *C01B 2203/0811* (2013.01); *C01B 2203/1241* (2013.01); *C01B 2203/1258* (2013.01)

(58) Field of Classification Search
CPC ............... C07F 15/025; C07F 9/5027; C01B 2210/007; C01B 21/0488; C01B 3/384; B01D 53/1493; F23D 2203/1055; F23D 2203/1012; B01J 8/067; B01J 2208/00504; B01J 8/062; F23C 5/08
See application file for complete search history.

(56) References Cited

U.S. PATENT DOCUMENTS

| | | | | |
|---|---|---|---|---|
| 6,077,457 A | * | 6/2000 | Friesen et al. | 252/184 |
| 7,572,363 B2 | * | 8/2009 | Freitag et al. | 208/133 |
| 8,728,417 B2 | * | 5/2014 | Giroudiere et al. | 422/659 |

* cited by examiner

*Primary Examiner* — Anthony J Zimmer
*Assistant Examiner* — Syed Iqbal
(74) *Attorney, Agent, or Firm* — Millen, White, Zelano, Branigan, P.C.

(57) ABSTRACT

The invention relates to a process and an apparatus for producing synthesis gas (5) by steam reforming, in which nitrogen is separated off from a starting material (1) containing hydrocarbons and nitrogen in order to produce a low-nitrogen feed (4) for a burner-fired steam reformer (D), with formation of a hydrocarbon-containing residual gas (2) which subsequently serves as fuel (6). Nitrogen is separated off adsorptively (N) from the starting material and the hydrocarbon-containing residual gas (2) is used for firing the steam reformer (D).

11 Claims, 1 Drawing Sheet

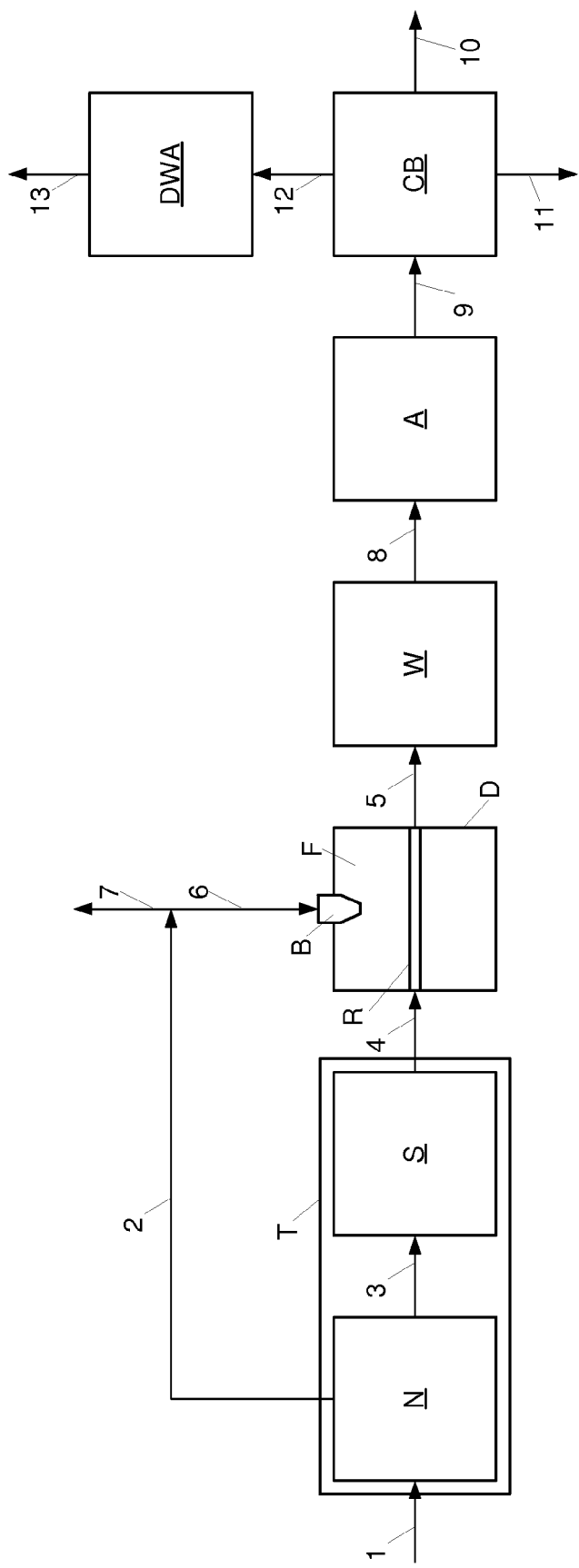

PROCESS AND APPARATUS FOR PRODUCING SYNTHESIS GAS

The invention relates to a process for producing synthesis gas by steam reforming, in which nitrogen is separated off from a starting material containing hydrocarbons and nitrogen in order to produce a low-nitrogen feed for a burner-fired steam reformer, with formation of a hydrocarbon-containing residual gas which subsequently serves as fuel.

The invention further provides an apparatus for carrying out the process of the invention.

In the following, the term synthesis gas is used to refer to gas mixtures which contain predominantly of hydrogen and carbon monoxide, but also contain water and carbon dioxide ($CO_2$). Especially carbon monoxide, hydrogen and/or a gas mixture consisting of hydrogen and carbon monoxide, known as oxo gas, are obtained as products from the synthesis gas by purification and fractionation and these are used in many ways in industry.

For the purposes of the present invention, the term low-nitrogen refers to a feed for a steam reformer when its nitrogen content does not exceed a value of 3% by volume.

Under industrial conditions, cryogenic processes are mostly used for separating the two synthesis gas components hydrogen and carbon monoxide. A prerequisite for the applicability of these processes is that the stream fed to the cryogenic gas fractionator used for carrying out the process is free of water, carbon dioxide and other materials which would lead to solids formation and thus to deposits at the low temperatures which occur. The synthesis gas is therefore firstly subjected to a multistep purification in which the major part of the materials which are undesirable in the cryogenic gas fractionator is removed in a $CO_2$ scrub. The synthesis gas is freed of the remaining residues in an adsorber station downstream of the $CO_2$ scrub.

Particularly when carbon monoxide having a purity of more than 99 mol % is to be obtained as product, the removal of nitrogen introduced with the synthesis gas into the cryogenic gas fractionator requires a considerable outlay in terms of apparatus and energy. In the prior art, nitrogen is therefore separated off from the starting material containing hydrocarbons and nitrogen by distillation in a cryogenic process so that the synthesis gas produced in the steam reformer is low in nitrogen. Such a process is described, for example, in the patent document EP0983218B1 (WO 98/5036; U.S. Pat. No. 5,852,061), in which the synthesis gas obtained by steam reforming is fed to a hydrocarbon synthesis. In order to prevent poisoning of the catalyst used in the hydrocarbon synthesis, nitrogen is separated off cryogenically from a hydrocarbon-containing starting material, giving a nitrogen-rich, hydrocarbon-containing residual gas which is subsequently used as fuel. However, the high costs incurred for the cryogenic removal of nitrogen, which considerably impair the economics of the process, are a disadvantage here.

The adsorptive removal of nitrogen from hydrocarbon-containing mixtures, in particular from natural gas, has been prior art for some years. Here, the gas mixture to be purified is passed through a vessel filled with a specific adsorbent. While the nitrogen present in the gas mixture is retained by the adsorbent, the major part of the hydrocarbons can be taken off again from the vessel. As soon as the adsorbent is saturated with nitrogen, the gas flow is interrupted and the adsorbent is regenerated, with the pressure in the vessel being below ambient pressure. The flushing gas enriched with desorbed materials (mostly nitrogen but also hydrocarbons) finally leaves the vessel as residual gas. Compared to the separation by distillation, the adsorptive removal of nitrogen can be carried out at considerably lower costs but a disadvantage is the comparatively low yield of the process which has hitherto ruled out its use in the treatment of feeds for steam reforming.

It is therefore an object of the present invention to provide a process and an apparatus of the type described at the outset which make it possible to overcome the above-described disadvantages of the prior art.

Upon further study of the specification and appended claims, other objects, aspects and advantages of the invention will become apparent.

According to the invention, the stated objects are achieved in terms of the process by the nitrogen being separated off adsorptively from the starting material and the hydrocarbon-containing residual gas being used for firing the steam reformer.

The process of the invention makes it possible to cover all or at least part of the fuel required for firing the steam reformer by residual gas from the adsorptive removal of nitrogen, so that, in the most favorable case, the importation of additional fuel can be dispensed with entirely. The residual gas can thus be utilized as material of value within the production of synthesis gas, as a result of which the disadvantage of the low yield of the adsorptive removal of nitrogen is largely overcome and the advantage of lower costs is almost fully brought to bear.

If the amount of the residual gas obtained in the adsorptive removal of nitrogen exceeds the amount of fuel required for firing the steam reformer, the excess amount is usefully exported as fuel and, for example, used for firing an adjacent steam reformer.

Advantageous embodiments of the process of the invention provide for carbon monoxide and/or hydrogen and/or oxo gas to be obtained as gas product from the synthesis gas produced.

Preference is given to using natural gas as starting material containing nitrogen and hydrocarbons.

The process of the invention allows gas products such as carbon monoxide and/or oxo gas to be obtained in high purity from the synthesis gas produced, and additional removal of further nitrogen can in the most favorable case be omitted entirely. Should it nevertheless be necessary to remove nitrogen from the synthesis gas, this can be carried out with a comparatively low outlay.

Furthermore, the invention provides an apparatus for producing synthesis gas having a burner-fired steam reformer and also a facility for producing a low-nitrogen feed for the steam reformer from a starting material containing hydrocarbons and nitrogen, which is connected via a line to a burner in such a way that a hydrocarbon-containing residual gas obtained in the removal of nitrogen from the starting material can be fed as fuel by the line to the burner.

In terms of an apparatus, the stated object is, according to the invention, achieved by a facility for producing a low-nitrogen feed comprising an adsorber for separating off nitrogen from the starting material containing nitrogen and hydrocarbons, which is connected to a burner for firing the steam reformer via a line in such a way that hydrocarbon-containing residual gas obtained in the adsorber can be fed as fuel via the line to the burner.

The adsorber is usefully filled with an adsorbent which is able to adsorb predominantly nitrogen from the starting material and desorb it again at a reduced pressure. Desorption of the adsorbent can be performed by flushing the adsorbent with a low-nitrogen, hydrocarbon-containing gas.

The facility for producing a low-nitrogen feed preferably has an adsorber station in which a plurality of adsorbers as are known from the prior art are connected to one another in such a way that both the low-nitrogen feed and the hydrocarbon-containing residual gas can each be obtained as continuous streams.

The invention further provides for the apparatus of the invention to be connected via a line to a fractionation facility in which oxo gas and/or carbon monoxide and/or hydrogen can be obtained as product from the synthesis gas.

In the following, the invention is illustrated by means of an example shown schematically in FIG. 1.

BRIEF DESCRIPTION OF THE DRAWINGS

Further details and advantages of the invention will be illustrated by the description hereinafter of an exemplary embodiment shown in the FIGURE, wherein:

FIG. 1 shows an apparatus according to the invention for producing low-nitrogen synthesis gas from which a plurality of gas products are obtained in a downstream fractionation facility.

A starting material containing hydrocarbons and nitrogen, for example natural gas, is introduced via line 1 into a facility T in order to obtain a low-nitrogen feed 4 for the steam reformer D. In the facility T, the starting material 1 firstly goes into the adsorber station N in which nitrogen is separated off adsorptively from the starting material 1, giving a residual gas 2 containing nitrogen and hydrocarbons and also a low-nitrogen hydrocarbon stream 3. To separate off one or more further materials, for example sulphur, the low-nitrogen hydrocarbon stream 3 is fed into the separation apparatus S from which a hydrocarbon-rich stream 4 is taken off and introduced as feed into the reformer tubes R of the burner-fired steam reformer D where it is converted with the aid of a catalyst together with steam in an endothermic reaction into a synthesis gas 5 which contains hydrogen, carbon monoxide, carbon dioxide and also water and is low in nitrogen. In order to obtain the heat required for steam reforming, a part 6 of the residual gas 2 containing nitrogen and hydrocarbons is fed to the burner B arranged in the firing space F of the steam reformer D and burnt. Residual gas 7 which is not required for heating the steam reformer D is exported as fuel and, for example, used for heating a steam reformer operated in parallel (not shown).

Water is condensed out of the synthesis gas 5 in the cooler W before the synthesis gas goes via line 8 into the carbon dioxide removal A, for example an aMDEA scrub. Here, carbon dioxide is separated off to form a gas mixture 9 which consists largely of carbon monoxide and hydrogen and is conveyed further into the cryogenic gas fractionator CB. In the cryogenic gas fractionator CB, which is configured without nitrogen removal, oxo gas 10 and also carbon monoxide 11 can be produced as products having a high purity because of the substantial absence of nitrogen in the synthesis gas 5. The hydrogen-rich stream 12 is introduced into a pressure swing adsorber DWA in order to obtain a high-purity hydrogen product 13 by removal of impurities.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding German patent application DE 10 2013 020 343.0, filed Dec. 3, 2013, are incorporated by reference herein.

The invention claimed is:

1. A process for producing synthesis gas (5) by steam reforming comprising:
    separating off nitrogen from a starting material (1) containing hydrocarbons and nitrogen in order to produce a low-nitrogen feed (4) for a burner-fired steam reformer (D), and a hydrocarbon-containing residual gas (2) which subsequently serves as fuel (6),
    wherein the nitrogen is separated off adsorptively (N) from the starting material and at least part of the hydrocarbon-containing residual gas (2) is used as fuel for firing the steam reformer (D).

2. The process according to claim 1, wherein a part of the residual gas (2) not required for firing the steam reformer (D) is exported as fuel.

3. The process according to claim 1, wherein carbon monoxide (11) and/or hydrogen (13) and/or oxo gas (10) is obtained as gas product from the synthesis gas (5) produced in steam reformer (D).

4. The process according to claim 2, wherein carbon monoxide (11) and/or hydrogen (13) and/or oxo gas (10) is obtained as gas product from the synthesis gas (5) produced in steam reformer (D).

5. The process according to claim 1, wherein natural gas containing nitrogen and hydrocarbons is used as starting material (1).

6. An apparatus for producing synthesis gas (5) comprising:
    a burner-fired steam reformer (D) and a facility (T) for producing a low-nitrogen feed (4) for the steam reformer (D) from a starting material (1) containing hydrocarbons and nitrogen,
    wherein said facility (T) is connected via a line (6) to a burner (B) of said steam reformer (D) in such a way that a hydrocarbon-containing residual gas (2), obtained by removal of nitrogen from the starting material in said facility (T), can be fed as fuel by the line (6) to the burner (B), and
    wherein said facility for producing a low-nitrogen feed (T) comprises an adsorber (N) for separating off nitrogen from the starting material (1) containing nitrogen and hydrocarbons, which is connected to said burner (B) for firing the steam reformer (D) via said line (6) in such a way that hydrocarbon-containing residual gas (2) obtained from the adsorber (N) can be fed as fuel via said line (6) to said burner (B).

7. The apparatus according to claim 6, wherein said adsorber (N) is filled with an adsorbent which is able to adsorb predominantly nitrogen from the starting material (1) containing nitrogen and hydrocarbons and desorb nitrogen again when the adsorbent is flushed with a low-nitrogen, hydrocarbon-containing gas.

8. The apparatus according to claim 6, wherein said adsorber (N) is part of an adsorber station in which a plurality of adsorbers are connected to one another in such a way that both the low-nitrogen feed (4) and the hydrocarbon-containing residual gas (2) can each be obtained as continuous streams.

9. The apparatus according to claim 6, wherein said steam reformer (D) is connected to a fractionation facility (W, A, CB, DWA) in which carbon monoxide (11) and/or hydrogen

(13) and/or oxo gas (10) can be obtained as gas product from the synthesis gas (5) produced in said steam reformer (D).

10. A process for producing synthesis gas (5) by steam reforming comprising:

introducing a gaseous feedstock (1) containing hydrocarbons and nitrogen into an adsorber wherein the nitrogen is separated off adsorptively (N) from said gaseous feedstock, removing from said adsorber a hydrocarbon-containing residual gas (2) and a low-nitrogen hydrocarbon stream (3), subjecting said low-nitrogen hydrocarbon stream (3) to steam reforming in a steam reformer fired by a burner to produce a synthesis gas, and burning said hydrocarbon-containing residual gas (2) in said burner for providing heat for said steam reforming.

11. An apparatus for producing synthesis gas (5) comprising:

a facility (T) for producing a low-nitrogen feed (4) and hydrocarbon-containing residual gas (2) from a gaseous feedstock (1) containing hydrocarbons and nitrogen, a steam reformer (D) having a burner(b), a line (6) connecting said facility to said burner (B) of said steam reformer (D) to transfer said hydrocarbon-containing residual gas (2) to said burner (B) as fuel, and wherein said facility (T) for producing a low-nitrogen feed (4) comprises an adsorber (N) for adsorptively separating off nitrogen from said gaseous feedstock (1).

\* \* \* \* \*